US007099704B2

(12) United States Patent
Taniguchi et al.

(10) Patent No.: US 7,099,704 B2
(45) Date of Patent: Aug. 29, 2006

(54) MUSIC PLAYER APPLICABLE TO PORTABLE TELEPHONE TERMINAL

(75) Inventors: Junya Taniguchi, Hamamatsu (JP); Nobukazu Nakamura, Hamakita (JP); Nobukazu Toba, Hamamatsu (JP); Takahiro Tanaka, Zushi (JP)

(73) Assignee: Yamaha Corporation, Hamamatsu (JP)

( * ) Notice: Subject to any disclaimer, the term of this patent is extended or adjusted under 35 U.S.C. 154(b) by 272 days.

(21) Appl. No.: 10/239,606

(22) PCT Filed: Mar. 27, 2001

(86) PCT No.: PCT/JP01/02442

§ 371 (c)(1),
(2), (4) Date: Apr. 7, 2003

(87) PCT Pub. No.: WO01/73749

PCT Pub. Date: Oct. 4, 2001

(65) Prior Publication Data

US 2003/0176206 A1 Sep. 18, 2003

(30) Foreign Application Priority Data

Mar. 28, 2000 (JP) ........................................ 2000-88204

(51) Int. Cl.

| | |
|---|---|
| ***H04M 1/00*** | (2006.01) |
| ***H04M 3/00*** | (2006.01) |
| ***H04L 12/26*** | (2006.01) |
| ***G08B 5/22*** | (2006.01) |
| ***G08B 23/00*** | (2006.01) |

(52) U.S. Cl. ................. 455/567; 455/556.1; 455/550.1; 455/418; 375/222; 340/7.6; 340/573.5

(58) Field of Classification Search ................. 455/567, 455/233.1, 556.1, 550.1, 267, 406, 418, 412.2; 375/222; 704/219; 340/7.6, 328, 573.5, 565; 700/94; 434/114; 84/609; 463/19
See application file for complete search history.

(56) References Cited

U.S. PATENT DOCUMENTS

| | | | | | |
|---|---|---|---|---|---|
| 4,478,525 | A | * | 10/1984 | Yamaguchi | 368/273 |
| 4,602,546 | A | * | 7/1986 | Shinohara | 84/609 |
| 4,796,014 | A | * | 1/1989 | Chia | 340/573.5 |
| 5,054,787 | A | * | 10/1991 | Richardson | 463/19 |
| 5,146,473 | A | * | 9/1992 | Critchlow et al. | 375/222 |
| 5,214,543 | A | * | 5/1993 | Takao | 360/71 |

(Continued)

FOREIGN PATENT DOCUMENTS

| | | |
|---|---|---|
| CN | 1172319 A | 2/1998 |
| JP | 9-181795 | 7/1997 |

OTHER PUBLICATIONS

OKI Electric Industry Co., Ltd., "Development of Audio LSI for Car Navigations," Oct. 29, 1997.
OKI Semiconductor, "MSM9841: Recording and Playback LSI with Built–in FIFO," Jul. 2000.
OKI Silicon Solutions Company (Japan Site), "Quasi–Stereo ADPCM SPeech LSIs MSM9841 and MSM9842," (Japan).
Yamaha LSI, "MMA YMZ263B Application Manual: Multimedia Audio & Game Interface Controller," (Japan), p. 22–39, May 1993.

*Primary Examiner*—William Trost
*Assistant Examiner*—Kiet Doan
(74) *Attorney, Agent, or Firm*—Pillsbury Winthrop Shaw Pittman LLP

(57) ABSTRACT

A music playback device applicable to a portable telephone terminal device uses a sequence data FIFO memory and a waveform data FIFO memory both having limited storage capacities. A system CPU performs successive transfer of sequence data and waveform data in response to shortage events of the memories. Hence, it is possible to actualize high-quality playback of musical tunes with small storage capacities of the memories and with small load of processing of the system CPU.

11 Claims, 9 Drawing Sheets

U.S. PATENT DOCUMENTS

| | | | | | |
|---|---|---|---|---|---|
| 5,225,944 | A | * | 7/1993 | Takao | 360/13 |
| 5,315,638 | A | * | 5/1994 | Mukari | 455/418 |
| 5,388,992 | A | * | 2/1995 | Franklin et al. | 434/114 |
| 5,675,509 | A | * | 10/1997 | Ikami et al. | 370/536 |
| 5,726,629 | A | * | 3/1998 | Yu | 340/565 |
| 5,753,844 | A | | 5/1998 | Matsumoto | 84/609 |
| 5,778,335 | A | * | 7/1998 | Ubale et al. | 704/219 |
| 6,094,587 | A | * | 7/2000 | Armanto et al. | 455/567 |
| 6,167,251 | A | * | 12/2000 | Segal et al. | 455/406 |
| 6,252,495 | B1 | * | 6/2001 | Nakamura | 340/328 |
| 6,255,577 | B1 | * | 7/2001 | Imai | 84/609 |
| 6,355,870 | B1 | * | 3/2002 | Tsai et al. | 84/605 |
| 6,366,791 | B1 | * | 4/2002 | Lin et al. | 455/567 |
| 6,411,198 | B1 | * | 6/2002 | Hirai et al. | 340/7.6 |
| 6,501,967 | B1 | * | 12/2002 | Makela et al. | 455/567 |
| 6,549,767 | B1 | * | 4/2003 | Kawashima | 455/412.2 |
| 6,554,711 | B1 | * | 4/2003 | Kawasaki et al. | 463/43 |
| 2002/0103552 | A1 | * | 8/2002 | Boucher et al. | 700/94 |

* cited by examiner

MUSIC PLAYER APPLICABLE TO PORTABLE TELEPHONE TERMINAL

TECHNICAL FIELD

This invention relates to music playback devices that are applicable to portable telephone terminals such as automobile phones and cellular phones.

BACKGROUND ART

Conventionally, there are provided digital cellular systems such as PDC (Personal Digital Cellular telecommunication system) and PHS (Personal Handyphone System). Upon receipt of incoming calls, portable telephone terminals such as cellular phones held by users produce incoming call sounds to notify users of reception of incoming calls. As incoming call sounds, telephone terminal devices conventionally produce beep sounds, which are offensive to ears of users. Recently, telephone terminal devices produce melody sounds as incoming call sounds instead of the conventional beep sounds.

The aforementioned telephone terminal devices are capable of producing melody sounds, however, which are not satisfactory in sound quality.

In order to improve the sound quality, music playback devices that reproduce music data representing musical tunes on telephone terminal devices are provided. A typical example of a music playback device for use in a telephone terminal device is constituted by a central processing unit (CPU), a read-only memory (ROM), a random-access memory (RAM), and a sound source. Herein, the CPU runs automatic performance programs stored in the ROM, so that music data stored in the ROM or RAM are read, and tone-generation parameters are set to the sound source. Thus, musical tunes are played back on the telephone terminal device.

It is required that telephone terminal devices, particularly portable telephones sold in the market, are reduced in size and price and are designed to have multiple functions. In addition, it is required that telephone terminal devices are capable of performing numerous functions such as call transmission and reception functions, display function, etc. In the music playback device incorporated into the portable telephone terminal device, the CPU should perform music playback processes in addition to telephone function processes. Hence, the music playback device requires a high-speed CPU for processing. This raises a problem in that the portable telephone terminal device having a high-speed CPU must be expensive.

Melody ICs are known as devices that are exclusively designed to reproduce melodies. A typical example of a melody IC for use in a portable telephone terminal device is constituted by a sound source, a sequencer, and a ROM that is exclusively used as a music data storage. By applying music playback instructions from the external device, the melody IC reproduces music data stored in the ROM to play back a melody of a musical tune. By incorporating such a melody IC into the portable telephone terminal device, the CPU does not necessarily perform music playback processes. Using the melody IC eliminates the necessity that the CPU executes music playback processes. Hence, it is possible to use a low-cost and low-speed CPU for the portable telephone terminal device incorporating the melody IC.

Normally, the melody IC provides a ROM having a small storage capacity for music data, hence, the melody IC is capable of storing the limited number of musical tunes, so it is impossible to increase time lengths for playback of musical tunes. Because of the small storage capacity of the ROM, the melody IC cannot store the considerable amount of music data realizing high-quality playback of musical tunes. Hence, the portable telephone terminal device incorporating the melody IC plays back only a melody of low sound quality.

It is an object of the present invention to provide a music playback device that is capable of reproducing musical tunes in high sound quality on the basis of music data stored in the limited storage capacity by using a low-speed operational processor. In addition, it is another object of the present invention to provide a portable telephone terminal device incorporating a music playback device realizing high-quality playback of musical tunes by using the limited storage capacity for music data and by using a low-speed operational processor.

DISCLOSURE OF INVENTION

A portable telephone terminal device such as a cellular phone has a music playback device to play back musical tunes for prescribed uses, namely incoming call notification, hold sound generation, BGM playback, and music playback. The music playback device basically comprises a sequence data FIFO memory for storing sequence data containing duration data and note data with respect to a musical tune, a waveform data FIFO memory for storing waveform data representing samples of musical tone waveforms that are made by compressive coding, a decoder for decoding waveform data to reproduce musical tone signals, and a sequencer for controlling the decoder to reproduce musical tone signals in conformity with the musical tune on the basis of the sequence data. The duration data represents a time interval that elapses before the start timing of note data.

When the sequence data FIFO memory runs short of sequence data in progression of reproduction of a musical tune, it issues a sequence data transfer request (S-IRQ) to a system CPU and urges it to transfer the next portion of sequence data thereto. When the waveform data FIFO memory runs short of waveform data in progression of reproduction of a musical tune, it issues a waveform data transfer request (W-IRQ) to the system CPU and urges it to transfer the next portion of waveform data thereto. Thus, the system CPU successively transfers sequence data to the sequence data FIFO memory to fill its storage capacity, and it also successively transfers waveform data to the waveform data FIFO memory to fill its storage capacity. This brings reduction of storage capacities for memories while securing high-quality playback of musical tunes. In addition, the system CPU bears merely a small load of processing in execution of music playback processes, so a high-speed CPU is not necessarily needed for the system CPU.

Incidentally, it is possible to provide multiple waveform data FIFO memories with respect to multiple channels, so that the decoder simultaneously reproduces musical tone signals of multiple channels in time division multiplexing.

BEST MODE FOR CARRYING OUT THE INVENTION

This invention will be described in further detail by way of examples with reference to the accompanying drawings.

Figure 1:
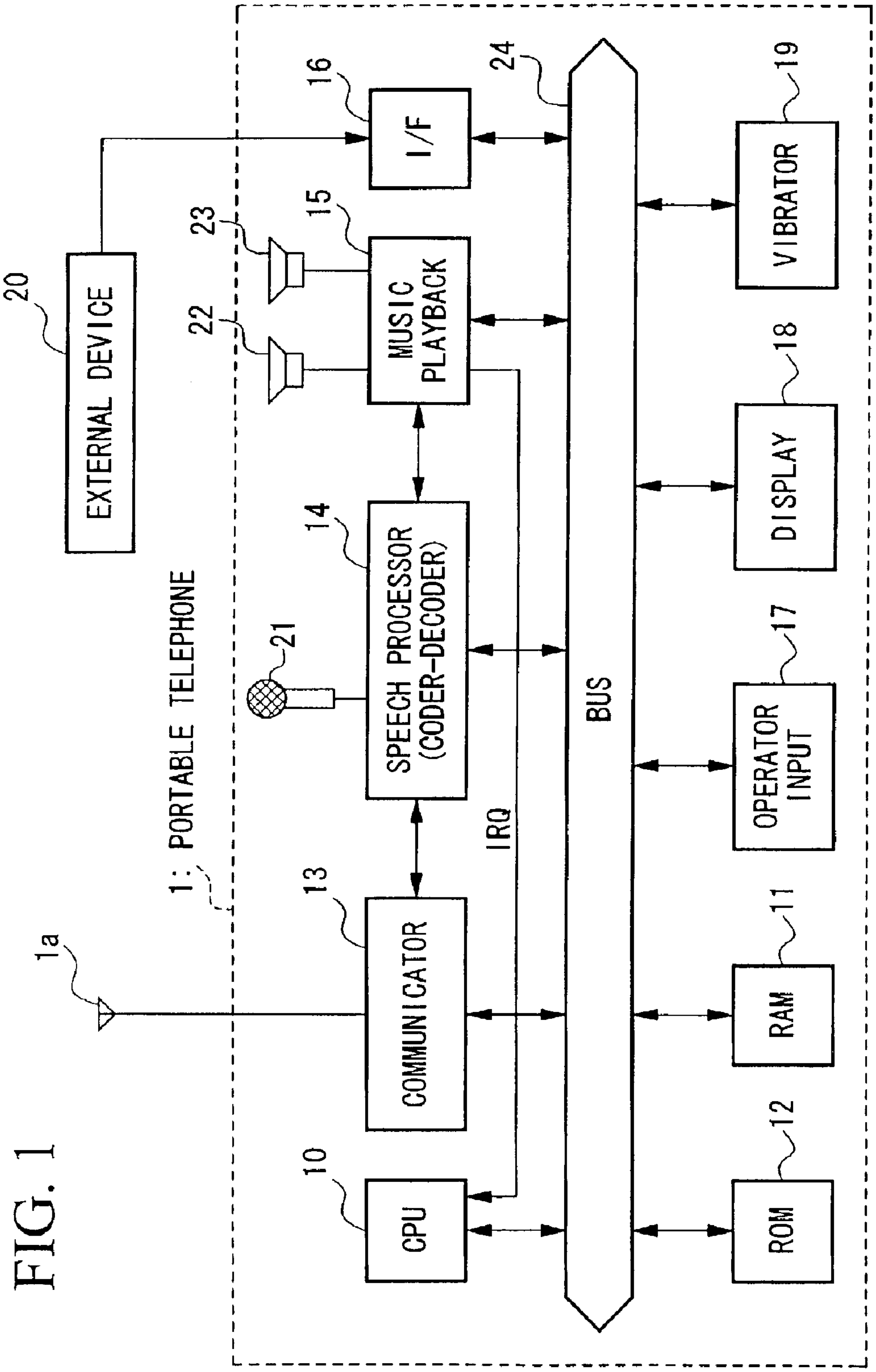
FIG. 1 is a block diagram showing the electric configuration of a portale telephone having a music playback device in accordance with a preferred embodiment of the invention.

FIG. 1 shows the electric configuration of a portable telephone incorporating a music playback device in accordance with the preferred embodiment of the invention. That is, a portable telephone 1 has a retractable antenna 1*a* coupled with a communicator 13 having modulation-demodulation functions. A system CPU 10 performs overall controls on various sections or blocks of the system of the cellular phone 1 by running telephone function programs. In addition, the system CPU 10 has a timer (not shown) that indicates a lapse of time during operations and that issues timer interruption by each specific time interval. Upon receipt of interrupt request signals (IRQ), the system CPU 10 performs transfer processes of music data and waveform data for assisting music playback processes, details of which will be described later. A system RAM 11 has a storage area for storing music data and waveform data, which are downloaded from a download center, a user setup data storage area, and a work area used for the purpose of the processing of the system CPU 10. A system ROM 12 stores various telephone function programs such as transmission and reception of calls executed by the system CPU 10 as well as programs implementing processes for assisting the aforementioned music playback processes. In addition, the system ROM 12 also stores various types of data such as preset music data and waveform data.

The communicator 13 demodulates incoming signals received by the antenna 1*a*, and it also modulates outgoing signals to be transmitted via the antenna 1*a*. That is, the communicator 13 demodulates incoming call signals to produce received speech signals representing the speech of a calling party transmitted thereto. The received speech signals are decoded by a speech processor (coder-decoder) 14. In addition, the speech processor 14 performs compressive coding on transmitting speech signals representing the speech of the user of the portable telephone 1. That is, the speech processor 14 is designed to perform high-efficiency compressive coding/decoding on speech signals, for example, the speech processor 14 is constituted as a coder-decoder based on the code excited linear predictive coding (CELPC) system or adaptive differential pulse-code modulation (ADPCM) system. A music playback section 15 realizing the music playback device of the present invention is coupled with a speaker 22 to produce the received speech of received speech signals given from the speech processor 14. In addition, the music playback section 15 reproduces music data to produce incoming call sound or hold sound. The incoming call sound is produced by a speaker 23, while the hold sound is mixed together with the received speech and is produced by the speaker 22.

The music playback section 15 contains a music data storage having a small storage capacity, and a waveform data storage. During reproduction of music data by the music playback section 15, a vacant area having a prescribed size is produced inside of the music data storage and/or the waveform data storage. In that case, the music playback section 15 issues an interrupt request signal (IRQ) to the system CPU 10, which in turn accesses the system RAM 11 or system ROM 12 to read the next portion of music data and/or waveform data. Thus, the next portion of music data and/or waveform data is transferred to the music playback section 15. An interface (I/F) 16 is used to download from an external device 20 such as a personal computer the music data and/or waveform data, which are transferred to the system RAM 11. An operator input section 17 contains various types of buttons such as function buttons and dial buttons designating numerals ranging from ‘0’ to ‘9’. A display 18 displays on the screen a telephone function menu and various types of characters and/or images in response to operations of buttons on the operator input section 17. In response to an incoming call, the system CPU 10 activates the vibrator 19 to generate vibration, which is substituted for incoming call sound. Due to the activation of the vibrator 19, the body of the portable telephone 1 is vibrated to notify the user of reception of an incoming call. All of function blocks of the portable telephone 1 are interconnected together by way of a bus 24 to send or receive instructions and data.

The portable telephone 1 has capabilities of downloading music data and waveform data via telephone lines or various types of networks. Next, procedures and operations for downloading music data will be described with reference to FIG. 2, wherein portable telephones 1 and 101 each having a music playback device are connected with telephone line networks.

Figure 2:
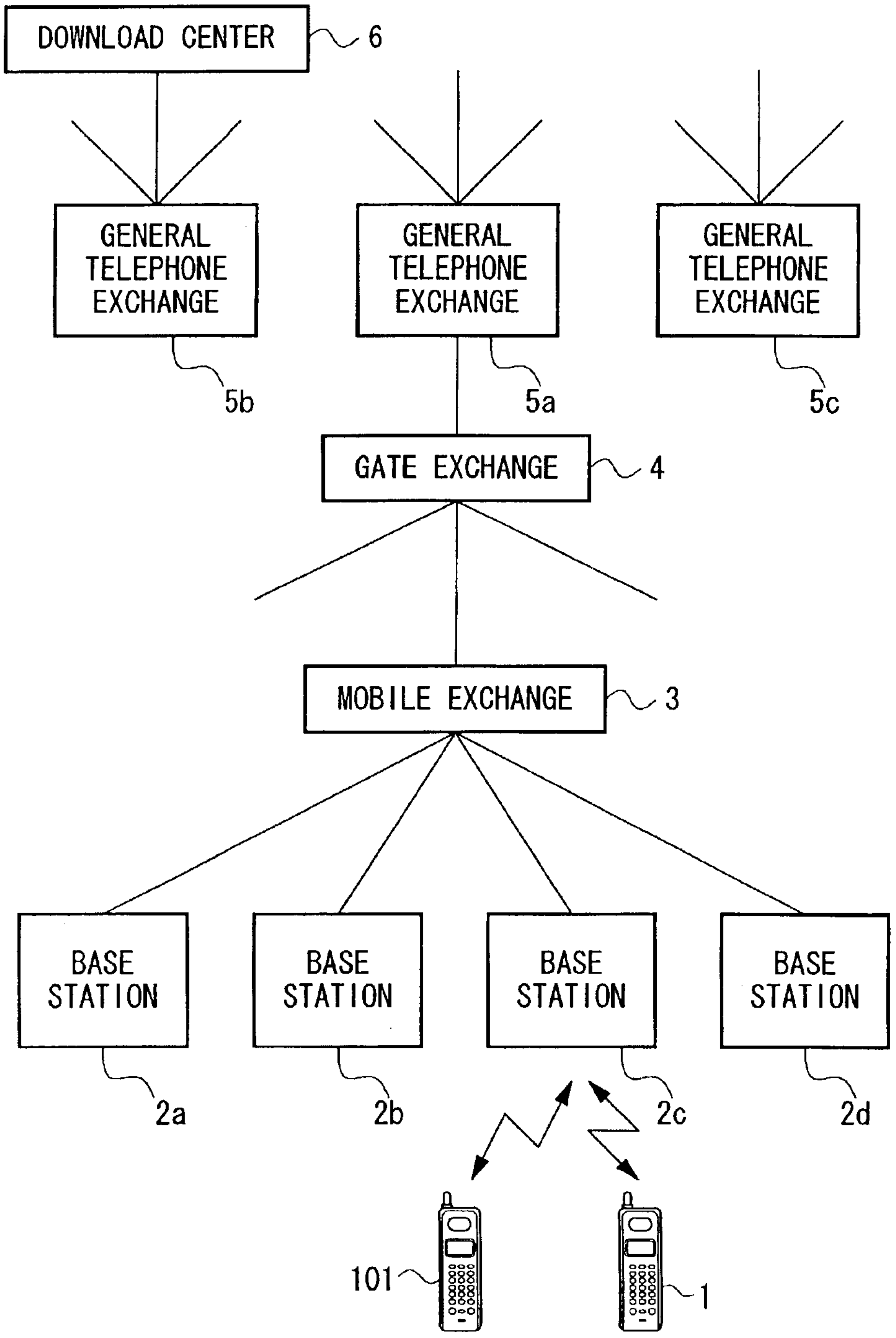
FIG. 2 is a conceptual system diagram showing connections for communications of portable telephones via telephone lines.

In general, cellular systems provided for communications of portable telephones employ small zone systems, wherein numerous radio communication zones are arranged in service areas. In FIG. 2, there are provided four base stations 2*a* to 2*d* that cover and manage radio communication zones respectively. Specifically, FIG. 2 shows that the base station 2*c* manages a radio communication zone to which the portable telephones 1 and 101 corresponding to mobile stations belong. To realize communications with general telephone terminal devices, the portable telephones 1 and 101 are connected via the base station 2*c* to a mobile exchange 3, from which they are further connected with general telephone networks. Thus, the portable telephones 1 and 101 are connected with the base station managing the radio communication zone by way of radio communication lines, hence, the users of the portable telephones 1 and 101 are able to make communications with other telephone terminal devices.

Next, a detailed description will be given with respect to an example of the cellular system shown in FIG. 2, wherein the portable telephones 1 and 101 belong to the same radio communication zone managed by the base station 2*c* within the four base stations 2*a*–2*d*. The portable telephones 1 and 101 are connected with the base station 2*c* by radio communication lines, so that uplink signals for use in conversation and registration of location are received and processed by the base station 2*c*. The base stations 2*a*–2*d* manage different radio communication zones, which may adjoin with each other. It is possible to control the output powers of the base stations 2*a*–2*d* such that the peripheral portions of the radio communication zones mutually and partially overlap with each other. The base stations 2*a*–2*d* are connected with the mobile exchange 3 by way of multiplexed lines. FIG. 2 shows a single mobile exchange 3 and a single gate exchange 4 only for the simplification of illustration, however, there may be provided plural mobile exchanges whose lines are concentrated on plural gate exchanges, which may be connected with a general telephone exchange 5*a*. The gate exchanges are mutually connected with each other by trunk transmission lines. General telephone exchanges 5*a*, 5*b*, 5*c* are arranged in service areas respectively, wherein they are mutually connected with each other by way of trunk transmission lines. Each of the general telephone exchanges 5*a*–5*c* is connected with numerous general telephones. The general telephone exchange 5*b* is connected with a download center 6.

The download center 6 corresponds to computer facilities used for the purpose of the distribution of music data and information to general telephone terminals or other communication devices. That is, the download center 6 accumulates at all the times numerous music data and waveform data, which are updated by additions of new musical tunes at any time. The present system allows the users of the portable telephones 1 and 101 to download music data and waveform data from the download center 6 connected with general telephone networks. In order to download music data from the download center 6, the user of the portable telephone 1 designates a prescribed telephone number to call the download center 6. Thus, there is established a communication path between the portable telephone 1, base station 2*c*, mobile exchange 3, gate exchange 4, general telephone exchanges 5*a* and 5*b*, and download center 6. Then, the prescribed musical tune selection menu is displayed on the screen of the display 18 of the portable telephone 1, according to which the user operates dial buttons on the operator input section 17 to select a desired musical tune (or desired musical tunes). Thus, the user is able to download music data of the desired musical tune(s) onto the portable telephone 1 from the download center 6. Similarly, the user is also able to download desired waveform data onto the portable telephone 1 from the download center 6.

Figure 3:
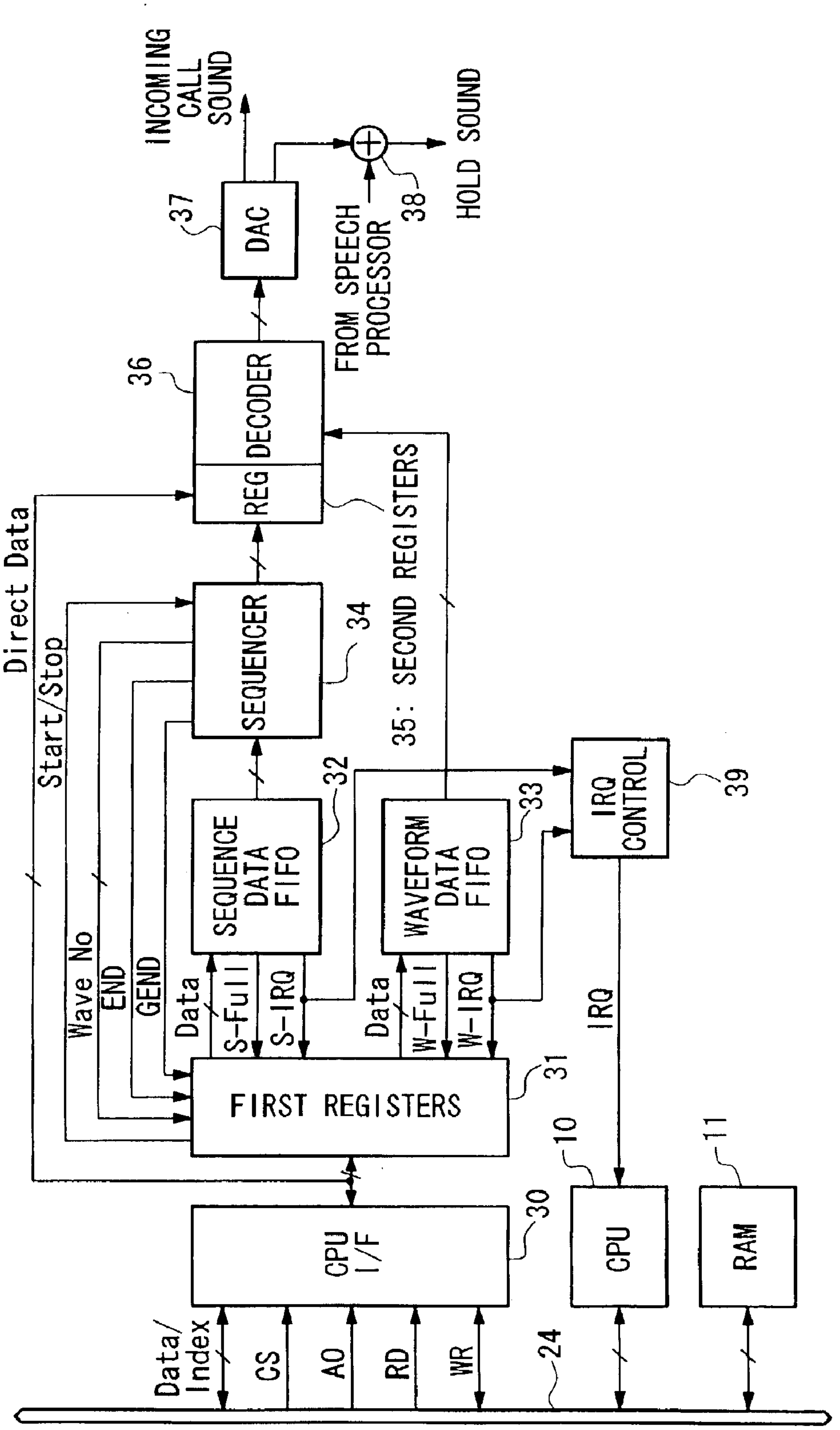
FIG. 3 is a block diagram showing electric configurations of selected parts of a portable telephone, particularly internal parts of a music playback section in accordance with a first embodiment of the invention.

FIG. 3 shows the electric configuration of the music playback section 15 corresponding to a music playback device in accordance with the first embodiment of the invention.

The music playback section 15 of FIG. 3 comprises a CPU interface (CPU I/F) 30, first registers 31, a sequence data FIFO memory 32, a waveform data FIFO memory 33, a sequencer 34, second registers (REG) 35, a decoder 36, a digital-to-analog converter (DAC) 37, a mixer 38, and an IRQ control section 39. Herein, 'FIFO' is an abbreviation for 'First-In-First-Out' in which data input first are output first.

The CPU interface 30 is connected to the system CPU 10 by way of an 8-bit data line (Data/Index), a chip select line (CS), an address control line (A0), a read control line (RD), and a write control line (WR). The address control line is used to designate whether signals on the data line represent data or indexes. Indexes are used to designate addresses of registers contained in the first registers 31 and the second registers 35 respectively. By sequentially writing data and indexes to the CPU interface 30 via the data line, it is possible to write data to registers that are designated by indexes within the first registers 31 and second registers 35. In this case, signals of the address line designate distinctions between signals of the data line. In a read mode, indexes are written to the CPU interface 30 via the data line, then, read instructions are applied to the CPU interface 30 via the read control line. Thus, it is possible to read data from registers that are designated by indexes within the first registers 31 and second registers 35.

The first registers 31 contain five registers, each of which stores 8-bit data. The five registers are given prescribed names, that is, a sequencer control register, a sequence data register, a waveform data register, a status register, and a waveform number register.

The system CPU 10 writes sequencer control data to the sequencer control register to control the sequencer 34. The sequencer control data may contain a sequencer start instruction for starting playback of musical tones and/or a sequencer stop instruction for stopping playback of musical tones.

Figure 5:
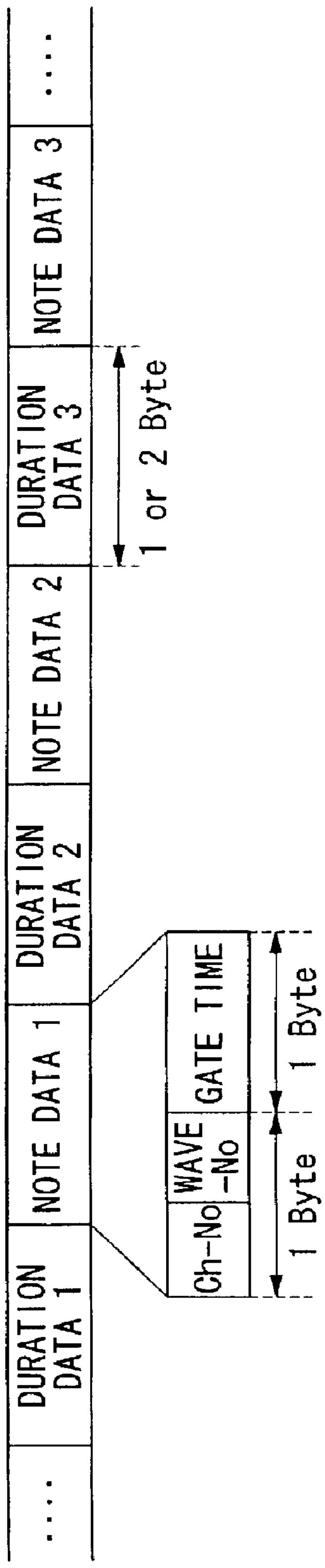
FIG. 5 shows an example of the format for use in sequence data stored in a sequence data FIFO memory shown in FIG. 3.

The system CPU 10 writes sequence data such as music data to the sequence data register. The sequence data are formed in the prescribed format, which will be described later. As shown in FIG. 5, music data of a single musical tune are constituted by alternately arranging duration data and note data, wherein the duration data represent time intervals between tone-generation timings of musical tones, and the note data correspond to tone-generation data. The sequence data written into the sequence data register are directly and immediately transferred to the sequence data FIFO memory 32.

The system CPU 10 writes waveform data to the waveform data register, from which waveform data are directly and immediately transferred to the waveform data FIFO memory 33. Details of waveform data will be described later. Roughly speaking, waveform data are made by performing coding operations or compressive coding operations on waveform amplitude values, which are extracted by sampling vocal sound, speech, and musical tones produced by actually playing musical instruments.

The status register represents music playback states (or statuses) of the music playback section 15. The status register stores a sequence data Full flag (S-Full) and a sequence data IRQ flag (S-IRQ) from the sequence data FIFO memory 32 as well as a waveform data Full flag (W-Full) and a waveform data IRQ flag (W-IRQ) from the waveform data FIFO memory 33. In addition, it also stores a sequence data END flag (END) and a gate time END flag (GEND) from the sequencer 34. The content of the status register is read by the system CPU 10.

The waveform number register stores waveform numbers that designate waveform data to be reproduced. The content of the waveform number register is read by the system CPU 10. Incidentally, the sequencer 34 extracts waveform numbers (WAVE-No) from the note data, so that the read waveform numbers are supplied to the first registers 31.

The sequence data FIFO memory 32 has a storage capacity of thirty-two bytes (i.e., 32×8 bits), for example. In a write mode, the system CPU 10 sequentially writes sequence data, which correspond to a selected musical tune, to the sequence data FIFO memory 32 by way of the sequence data register within the first registers 31. In a read mode, the sequence data are sequentially read from the sequencer 34 in conformity with a write order. Once the sequence data are read by the sequencer 34, they are discarded in the sequence data FIFO memory 32. In addition to the aforementioned FIFO functions, the sequence data FIFO memory 32 has functions of monitoring amounts of sequence data stored therein. In the full condition where the amount of sequence data stored in the sequence data FIFO memory 32 reaches thirty-two bytes, the sequence data FIFO memory 32 issues a sequence data Full flag (S-Full) and sets it to the status register of the first registers 31. In the shortage condition where the amount of sequence data stored in the sequence data FIFO memory 32 decreases under the prescribed amount (e.g., eight bytes) that is preset by the system CPU 10, the sequence data FIFO memory 32 issues a sequence data IRQ flag (S-IRQ) and sets it to the status register of the first registers 31. The sequence data IRQ flag is also supplied to the IRQ control section 39 to notify the system CPU 10 of the shortage condition of the sequence data FIFO memory 32.

Figure 7:
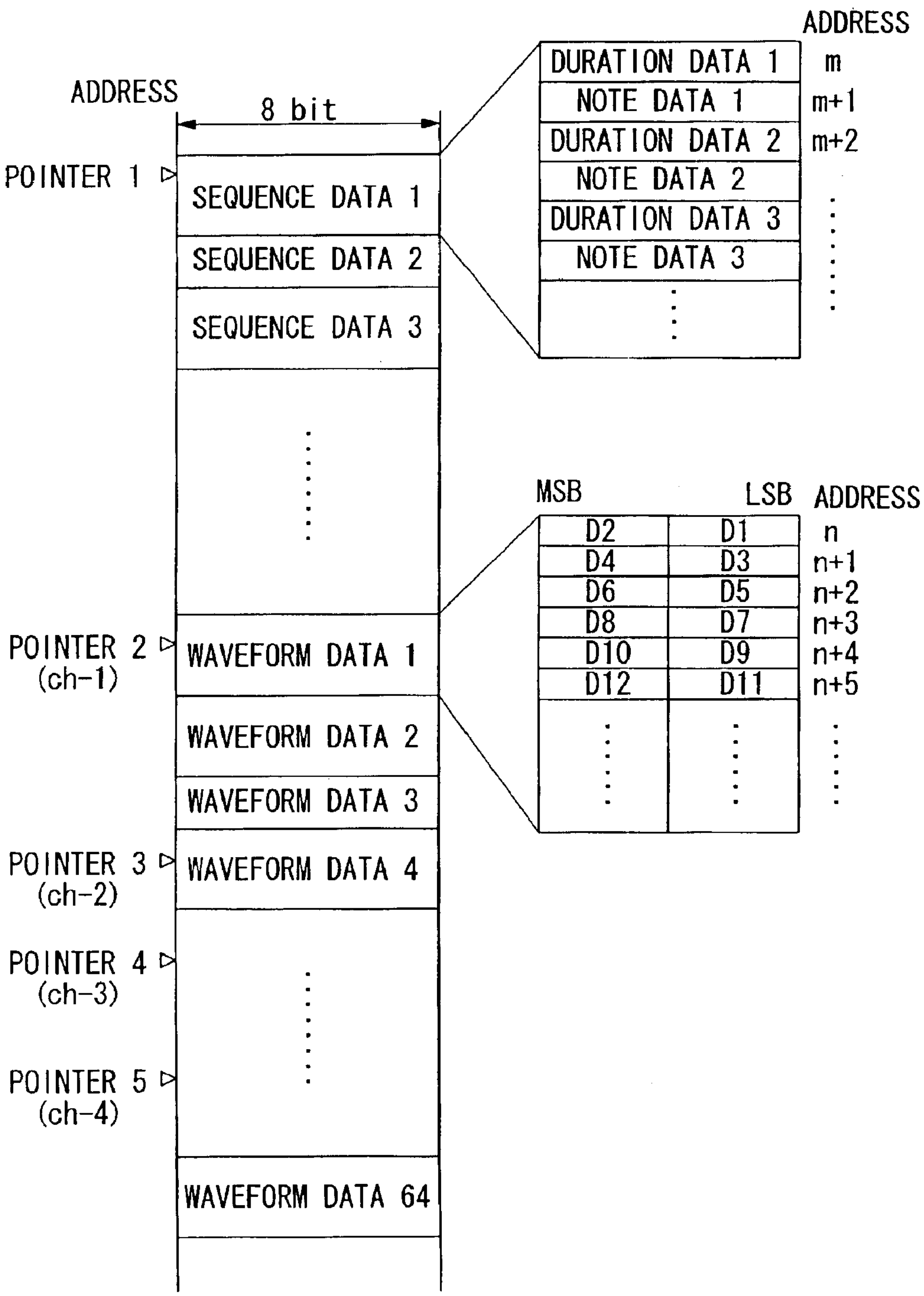
FIG. 7 shows a map of a system RAM for storing sequence data and waveform data.

The waveform data FIFO memory 33 has a storage capacity of 384 bytes (i.e., 384×8 bits), for example. In a write mode, the system CPU 10 sequentially writes waveform data to the waveform data FIFO memory 33 by way of the waveform data register within the first registers 31. In a read mode, the waveform data are sequentially read by the sequencer 34 or decoder 36. Once the waveform data are read by the sequencer 34 or decoder 36, they are discarded in the waveform data FIFO memory 33. The waveform data are formed in the prescribed format realizing ADPCM (or adaptive differential pulse-code modulated) waveform data that are created based on PCM (or pulse-code modulated) waveform data consisting of 16-bit samples, for example. That is, the PCM waveform data are compressed by an ADPCM encoder to the ADPCM waveform data consisting of 4-bit samples. FIG. 7 shows an example of waveform data, wherein 'waveform data 1' consists of eight bits (or one byte) that contain two samples of ADPCM waveform data. In addition to the aforementioned FIFO functions, the waveform data FIFO memory 33 has functions of monitoring amounts of waveform data stored therein. In the full condition where the amount of waveform data stored in the waveform data FIFO memory 33 reaches 384 bytes, the waveform data FIFO memory 33 issues a waveform data Full flag (W-Full) and sets it to the status register of the first registers 31. In the shortage condition where the amount of the waveform data decreases under the prescribed amount (e.g., 128 bytes) that is preset by the system CPU 10, the waveform data FIFO memory 33 issues a waveform data IRQ flag (W-IRQ) and sets it to the status register of the first registers 31. The waveform data IRQ flag is also supplied to the IRQ control section 39 to notify the system CPU 10 of the shortage condition of the waveform data FIFO memory 33.

By writing a sequencer start instruction to the sequencer control register of the first registers 31, the sequencer 34 starts to operate in accordance with the sequencer start instruction. Prior to the sequencer start instruction, it is necessary that some amount of sequence data is precedently written to the sequence data FIFO memory 32. It is preferable that at least the head portion of waveform data designated by the sequence data is precedently written to the waveform data FIFO memory 33.

Outline operations of the sequencer 34 will be described below.

(1) The sequencer 34 inputs a head portion of sequence data consisting of duration data and note data, which are stored in the sequence data FIFO memory 32.

(2) A waveform number contained in note data 1 is written to the waveform number register of the first registers 31.

(3) If the corresponding waveform data are not precedently written to the waveform data FIFO memory 33, the waveform data FIFO memory 33 immediately issues a waveform data IRQ flag (W-IRQ), which is forwarded to the system CPU 10 via the IRQ control section 39. Thus, the system CPU 10 refers to the status register of the first registers 31 to recognize that the waveform data IRQ flag is caused by a shortage of waveform data in the waveform data FIFO memory 33. The system CPU 10 immediately proceeds to transfer of waveform data. In order to specify the transferring waveform data, the system CPU 10 refers to the waveform number written to the waveform number register of the first registers 31. Alternatively, the system CPU 10 specifies the waveform number based on the sequence data of the selected musical tune stored in the system RAM 11. Thereafter, the system CPU 10 manages how much the waveform data designated by the waveform number are to be transferred to the waveform data FIFO memory 33.

(4) After the waveform data are completely accumulated in the waveform data FIFO memory 33, the sequencer 34 waits for a prescribed time designated by duration data 1, then, it instructs the decoder 36 to start decoding on the waveform data corresponding to the note data 1. Concretely speaking, the sequencer 34 outputs tone-generation parameters containing start/stop signals, tone volume, etc., so that tone-generation parameters are written to the second registers (REG) 35 positioned just before the decoder 36. At this timing, the sequencer 34 inputs duration data 2 and note data 2 to make preparation for reproduction of the next waveform data. Herein, the preparation for the reproduction is the time management with respect to the duration data 2.

(5) After a lapse of the gate time contained in the note data 1, the sequencer 34 instructs the decoder 36 to stop decoding. In addition, the reproduced duration data and note data are cleared in the waveform data FIFO memory 33. Further, the sequencer 34 issues a gate time END flag (GEND) and sets it to the status register of the first registers 31. In the present embodiment, the system CPU 10 refers to the gate time END flag to immediately stop transferring the waveform data to the waveform data FIFO memory 33. Thus, it is possible to avoid unnecessary transfer of the waveform data, which are not needed for generation of musical tones, to the waveform data FIFO memory 33.

(6) Similar tone-generation processes are performed with respect to the note data 2. The tone-generation processes are continuously performed with respect to the waveform data towards an end of the sequence data. When detecting an end of the sequence data, the sequencer 34 and decoder 36 stop operations thereof. In addition, all data are cleared in the sequence data FIFO memory 32 and the waveform data FIFO memory 33. The sequencer 34 issues a sequence data END flag (END) and sets it to the status register of the first registers 31. With reference to the sequence data END flag, the system CPU 10 makes preparation for reproduction of the next sequence data.

When the sequencer 34 writes tone-generation parameters such as start/stop signals and tone volume to the second registers 35, the decoder 36 starts or stops decoding operations thereof Based on tone-generation parameters from the sequencer 34 and the waveform data from the waveform data FIFO memory 33, the decoder 36 decodes (or expands) ADPCM waveform data consisting of 4-bit samples to produce PCM waveform data consisting of 16-bit samples. The format of the waveform data is not necessarily limited to the ADPCM format, so it is possible to employ other types of formats that allow compression of waveform data, such as the DPCM (Differential Pulse-Code Modulation) format, MP3 (namely, Moving Picture Experts Group, audio layer 3) format, and TwinVQ (registered trademark) format. If the present embodiment is redesigned to use one of the aforementioned formats, the decoder 36 should be correspondingly reconstructed to cope with one of them. If the present embodiment is redesigned to reproduce waveform data of the non-compressed PCM format, it is necessary to skip decoding process of the decoder 36.

The music playback section 15 shown in FIG. 3 is originally designed such that the sequencer 34 is used to reproduce waveform data. Instead of using the sequencer 34, the music playback section 15 operates such that the system CPU 10 directly writes tone-generation parameters to the second registers 35 by means of the CPU interface 30 via a line named 'Direct Data'. Thus, it is possible to actualize real-time tone-generation functions of musical tones. In this case, the decoder 36 is also activated to decode waveform data from the waveform data FIFO memory 33. That is, it is necessary to supply and fill the waveform data FIFO memory 33 with waveform data. The music playback section 15 is installed in the portable telephone 1 (or 101) having game functions, for example. Due to real-time tone-generation functions of the music playback section 15, the portable telephone 1 can smoothly generate effective sounds in real time in connection with game events.

The sequence data FIFO memory 32 outputs a sequence data IRQ flag (S-IRQ) to notify the IRQ control section 39 that the amount of sequence data remained in the sequence data FIFO memory 32 decreases under the prescribed amount. Alternatively, the waveform data FIFO memory 33 outputs a waveform data IRQ flag (W-IRQ) to notify the IRQ control section 39 that the amount of waveform data remained in the waveform data FIFO memory 33 becomes lower than the prescribed amount. Upon receipt of the sequence data IRQ flag and/or the waveform data IRQ flag, the IRQ control section 39 issues an IRQ signal to the system CPU 10. Upon receipt of the IRQ signal, the system CPU 10 refers to the sequence data IRQ flag and/or the waveform data IRQ flag stored in the status register of the first registers 31, so that the system CPU 10 examines the cause of the IRQ to perform corresponding processes. Due to the setting of the sequence data IRQ flag, the system CPU 10 detects that the sequence data FIFO memory 32 runs short of the sequence data, so that the system CPU 10 proceeds to transfer of a certain amount of sequence data, which are 24 bytes (=32 bytes−8 bytes). The following portion of the sequence data is read from the system RAM 11 or system ROM 12, and are then transferred to the sequence data FIFO memory 32.

Due to the setting of the waveform data IRQ flag, the system CPU 10 detects that the waveform data FIFO memory 33 runs short of the waveform data, so that the system CPU 10 proceeds to transfer of a certain amount of waveform data, which are 256 bytes (=384 bytes−128 bytes). The following portion of the waveform data is read from the system RAM 11 or system ROM 12, and are then transferred to the waveform data FIFO memory 33. Incidentally, the system CPU 10 is not required to immediately perform transfer of the sequence data of 24 bytes and/or transfer of the waveform data of 256 bytes. In addition, the system CPU 10 is not required to transfer the sequence data of 24 bytes and/or the waveform data of 256 bytes entirely. That is, the transferring of the sequence data and/or waveform data is performed at the timing and by the amount, in which the music playback section 15 can continuously reproduce musical tones without interruption.

The aforementioned transfer of the sequence data and/or waveform data may be performed by an interrupt process. It is possible to perform transfer of the sequence data and/or waveform data without the interrupt process if the system CPU 10 directly accesses the status register of the first registers 31 to read the sequence data Full flag, sequence data IRQ flag, waveform data Full flag, and waveform data IRQ flag in predetermined periods. In that case, it is possible to exclude the IRQ control section 39 from the music playback section 15.

In the music playback section 15 of the first embodiment shown in FIG. 3, the sequencer 34 starts playback upon detection of a playback start instruction that is issued by the system CPU 10. The system CPU 10 issues a playback start instruction when the user operates a playback key of the portable telephone (1 or 101) to start playback of music or background music (BGM), or when the portable telephone receives incoming call notification to start playback of incoming call sound (or incoming call melody). Even when the user operates a hold key of the portable telephone to start playback of hold sound, the system CPU 10 issues a playback start instruction.

To start playback of musical tones, the sequencer 34 reads a head portion of the sequence data consisting of first note data and first duration data from the sequence data FIFO memory 32 so that a waveform number contained in the first note data is written to the waveform number register of the first registers 31. Thus, the waveform data designated by the waveform number are written to the waveform data FIFO memory 33 under the control of the system CPU 10. Thus, the music playback section 15 completes preparation for starting playback of a musical tone. At the tone-generation start timing based on the first duration data, the sequencer 34 controls the decoder 36 to start decoding on the waveform data. At the same time, the sequencer 34 reads the next portion of sequence data consisting of next duration data and next note data from the sequence data FIFO memory 32. By repeating the aforementioned operations, the decoder 36 sequentially decodes the waveform data to produce PCM waveform data, which are converted to analog waveform signals by the digital-to-analog converter 37, so that appropriate sound is reproduced based on analog waveform signals. When the reproduced sound correspond to music or incoming call sound (or incoming call melody), the speaker 23 produces the reproduced sound. When the reproduced sound correspond to BGM or hold sound, the reproduced sound is mixed with received speech signals from the speech processor 14 by the mixer 38, so that the mixed sound is produced by the speaker 22. In the case of the hold sound, received speech signals are muted in the mixer 38, so that only the hold sound is produced by the speaker 22.

During the decoding of the first note data, when the amount of waveform data stored in the waveform data FIFO memory 33 decreases under the prescribed amount (e.g., 128 bytes), the waveform data FIFO memory 33 issues a waveform data IRQ flag (W-IRQ), which is set to the status register of the first registers 31. The waveform data IRQ flag is also delivered to the IRQ control section 39 to notify the system CPU 10 of a shortage event of the waveform data in the waveform data FIFO memory 33. In response to the waveform data IRQ flag, the system CPU 10 writes the next portion of waveform data to the waveform data FIFO memory 33 by way of the waveform data register. As a result, even though the waveform data FIFO memory 33 has a relatively small storage capacity, it is possible to reproduce numerous waveform data, which are necessary for high quality reproduction of musical tones, without interruption.

When it comes to an end time of a tone-generation period based on the gate time of the first note data, the sequencer 34 stops the decoder 36 decoding the waveform data, so that the reproduced sound is stopped. At the same time, the sequencer 34 sets a gate time END flag (GEND) to the status register while it also clears the first duration data and first note data in the sequence data FIFO memory 32. Next, the sequencer 34 writes a waveform number contained in second note data to the waveform number register, so that the system CPU 10 writes waveform data designated by the waveform number to the waveform data FIFO memory 33. Then, the sequencer 34 waits for the start timing of a tone-generation period based on second duration data. When it comes to the start timing of the tone-generation period, the sequencer 34 controls the decoder 36 to start decoding of waveform data based on the second note data. At the same time, the sequencer 34 reads third duration data and third note data from the sequence data FIFO memory 32. The aforementioned operations are repeatedly performed till an end of the sequence data or until the user operates an end key of the portable telephone to stop playback. Until then, the portable telephone continuously produces reproduced sound based on the sequence data.

In the progression of reproduction of the waveform data on the basis of the sequence data, when the amount of sequence data stored in the sequence data FIFO memory 32 decreases under the prescribed amount (e.g., 8 bytes), the sequence data FIFO memory 32 issues a sequence data IRQ flag (S-IRQ), which is set to the status register within the first registers 31. At the same time, the sequence data IRQ flag is also delivered to the IRQ control section 39 to notify the system CPU 10 of a shortage event of the sequence data in the sequence data FIFO memory 32. In response to the sequence data IRQ flag, the system CPU 10 writes the next portion of sequence data to the sequence data FIFO memory 32 by way of the sequence data register. As a result, even though the sequence data FIFO memory 32 has a relatively small storage capacity, it is possible to reproduce numerous sequence data, which are required for long-time reproduction, without interruption.

Figure 4:
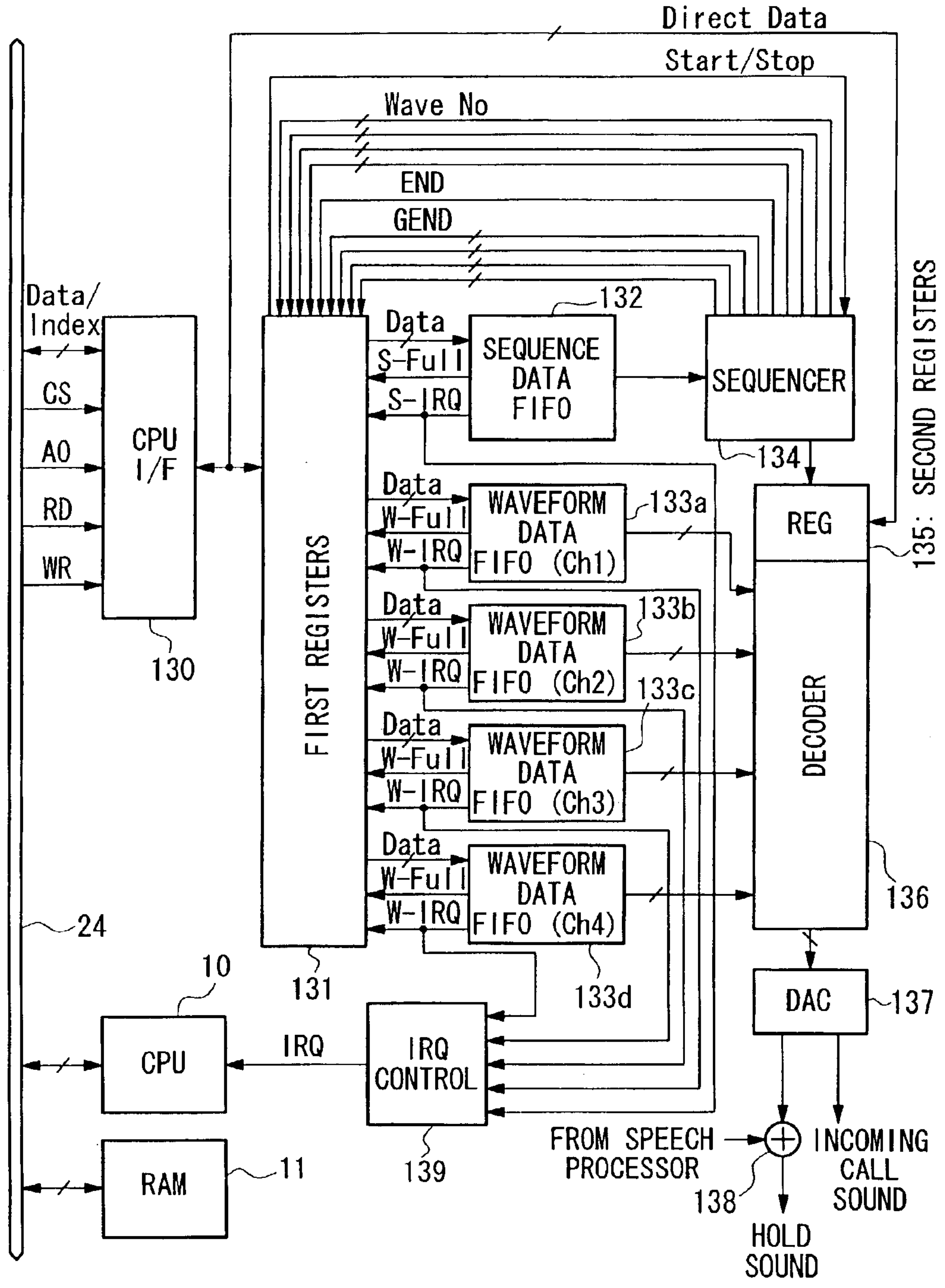
FIG. 4 is a block diagram showing electric configurations of selected parts of a portable telephone, particularly internal parts of a music playback section in accordance with a second embodiment of the invention.

With reference to FIG. 4, a description will be given with respect to the electric configuration of a music playback section 15 in accordance with a second embodiment of the invention.

The music playback section 15 of the second embodiment is designed to simultaneously reproduce waveform data of four channels based on sequence data of a single musical tune. In this case, sequence data have the prescribed format that allows simultaneous reproduction of waveform data of four channels. Thus, the music playback section 15 of the second embodiment secures simultaneous reproduction of waveform data of four channels. Unlike the music playback section 15 of FIG. 3 using a single waveform data FIFO memory 33, the music playback section 15 of FIG. 4 contains four waveform data FIFO memories 133*a*, 133*b*, 133*c*, and 133*d* in connection with four channels Ch1, Ch2, Ch3, and Ch4. In addition, the decoder 136 is designed to decode waveform data of four channels based on time division multiplexing (TDM).

Next, a description will be given with respect to an example of the format of sequence data with reference to FIG. 5. Herein, sequence data consist of duration data and note data (or tone-generation data), which are arranged alternately. Duration data consists of one byte or two bytes to represent an interval of time that elapses before start of reproduced sound corresponding to next note data. Note data consists of two bytes, which are constituted by 2-bit channel number (Ch-No) representing one of four tone-generation channels, 6-bit waveform number (WAVE-No) designating one of waveform data within sixty-four tone colors, and 8-bit gate time. Gate time corresponds to time data that represent a note length of reproduced sound based on note data.

The aforementioned format of sequence data shown in FIG. 5 is not only applied to the music playback section 15 of the second embodiment, which can simultaneously reproduce waveform data of four channels, but also applied to the music playback section 15 of the first embodiment, namely a monophonic music playback section in which the number of simultaneously reproduced sounds is set to ‘1’. Because the music playback section 15 of the first embodiment is designed to simultaneously reproduce only one sound, it neglects the channel number contained in note data.

FIG. 5 shows an example of sequence data that contain note data, which is constituted by a start and an end of tone generation, and waveform data corresponding to a musical tone to be generated, as tone-generation data. Other than note data, it is possible to include description of tone volume data such as volume control in sequence data. In this case, duration data, which are originally provided to represent time intervals between note data, should be modified to represent time intervals between various types of data.

Figure 6A:
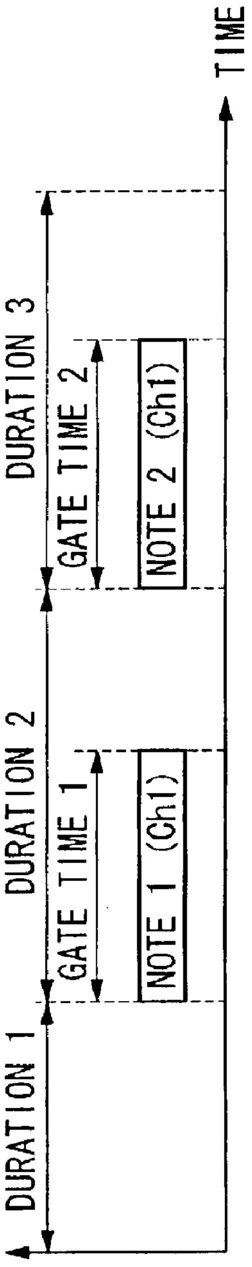
FIG. 6A is a time chart showing a first example of the time relationship between duration data and note data with respect to a single channel.
Figure 6B:
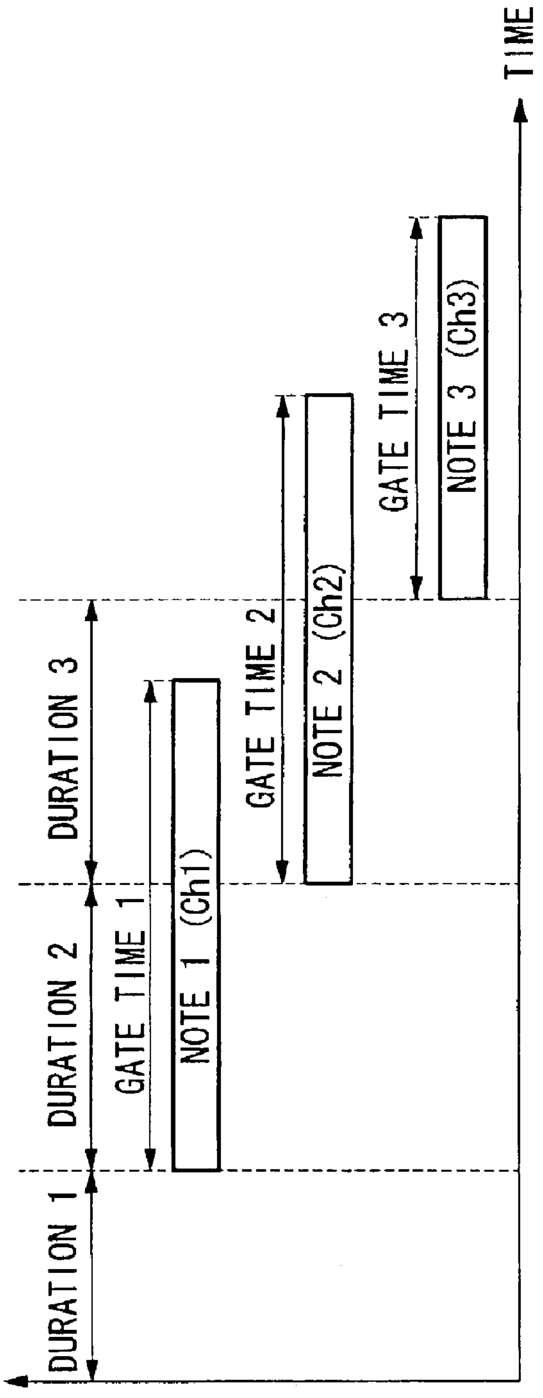
FIG. 6B is a time chart showing a second example of the time relationships between duration data and note data with respect to multiple channels.

FIGS. 6A and 6B show time relationships between duration data and note data. That is, FIG. 6A shows a first example of time relationship in which duration data represent time intervals between note data with respect to channel 1 (Ch1), wherein notes are consecutively arranged without being overlapped with each other in the same time line. That is, duration data 1 represents a time interval that elapses before the start timing of note data 1. Similarly, duration data 2 represents a time interval that elapses between start timings of note data 1 and note data 2; and duration data 3 represents a time interval that elapses between start timings of note data 2 and note data 3 (not shown).

FIG. 6B shows a second example of time relationship in which duration data represent time intervals between note data over different channels, wherein notes are arranged and partially overlapped with each other among different channels. That is, duration data 1 represents a time interval that elapses before the start timing of note data 1 of channel 1; duration data 2 represents a time interval that elapses between start timings of note data 1 of channel 1 and note data 2 of channel 2, which partially overlap with each other in a time axis. Similarly, duration data 3 represents a time interval that elapses between start timings of note data 2 of channel 2 and note data 3 of channel 3, which partially overlap with each other in a time axis.

Next, a description will be given with respect to a map of the system RAM 11 that stores sequence data and waveform data.

The number of musical tunes of sequence data to be stored depends upon the storage capacity of the system RAM 11. Hence, it is possible to store numerous sequence data as the system RAM 11 has a large storage capacity. In FIG. 7, the system RAM 11 stores multiple sets of sequence data, namely sequence data 1, sequence data 2, . . . , which correspond to different musical tunes respectively. Each sequence data contain pairs of duration data and note data, which are consecutively arranged at different addresses. In the sequence data 1, for example, duration data 1 is arranged at address m, note data 1 is arranged at address m+1, duration data 2 is arranged at address m+2, and note data 2 is arranged at address m+3. That is, duration data and note data are alternately arranged in sequence data.

The system CPU 10 manages how much the sequence data have been already transferred to the music playback section 15. Transfer management of sequence data is indicated by pointer 1, which moves (or scrolls) down along with sequence data in FIG. 7. That is, the pointer 1 designates the last address of the sequence data that have been already transferred to the music playback section 15.

The system RAM 11 stores at least a minimum number of waveform data, which are designated by waveform numbers included in reproduced sequence data. Sequence data of a single musical tune can designate maximally sixty-four kinds of waveform data (namely, sixty-four tone colors), so that waveform number consists of six bits allowing selection from among sixty four items. For this reason, as shown in FIG. 7, the system RAM 11 stores sixty four waveform data, namely waveform data 1 to waveform data 64. Waveform data are compressed to 4-bit samples by an ADPCM encoder. Two samples of compressed waveform data are stored at the same address of the system RAM 11. A storage location of each address designates one byte area (or 8-bit area), which is divided into two sections, namely a first section ranging from LSB to fourth bit and a second section ranging from fifth bit to MSB. At address n, for example, the first section stores a first sample of waveform data D1 while the second section stores a second sample of waveform data D2. Similarly, two samples are stored in each of following addresses (e.g., address n+1).

The system CPU 10 also manages how much waveform data have been already transferred to the music playback section 15. Transfer management of waveform data is indicated by pointers with respect to respective channels. That is, pointer 2 designates the last address of waveform data that have been already transferred to the music playback section 15 with respect to channel 1 (Ch-1). Similarly, pointer 3 designates the last address of waveform data that have been already transferred to the music playback section 15 with respect to channel 2 (Ch-2). In addition, pointer 4 designates the last address of waveform data transferred with respect to channel 3 (Ch-3); and pointer 5 designates the last address of waveform data transferred with respect to channel 4 (Ch-4). In the first embodiment using the 'monophonic' music playback section 15, there is provided only one pointer for designating the last address of waveform data transferred with respect to a single channel. The system RAM 11 of the portable telephone 1 shown in FIG. 1 is connected with the external device 20 via a communication line, so that it stores sequence data and waveform data downloaded from the external device 20. The system RAM 11 is not necessarily designed to store only the downloaded data. Hence, it is required to store preset sequence data and waveform data in advance in conformity with the aforementioned storage format.

In the second embodiment shown in FIG. 2, the music playback section 15 comprises a CPU interface (CPU I/F) 130, first registers 131, a sequence data FIFO memory 132, four waveform data FIFO memories 133*a*–133*d*, a sequencer 134, second registers (REG) 135, a decoder 136 operating in TDM, a digital-to-analog converter (DAC) 137, a mixer 138, and an IRQ control section 139. Basically, the aforementioned parts of the music playback section of the second embodiment operate as similar to foregoing ones of the music playback section of the first embodiment shown in FIG. 3. The music playback section 15 of the second embodiment is characterized by providing four waveform data FIFO memories 133*a*–133*d*, which operate to actualize simultaneous reproduction of musical tones of four channels. Hereinafter, the music playback section 15 of the second embodiment will be described, particularly in connection with operations of four memories for simultaneous reproduction of musical tones of four channels.

Suppose that the system CPU 10 issues a playback start instruction to the music playback section 15 shown in FIG. 4. In this case, the sequencer 134 starts playback upon detection of a playback start instruction. The system CPU 10 issues a playback start instruction when the user operates a playback key of the portable telephone 1 (or 101) to start playback of music or BGM, or when the portable telephone receives an incoming call to start playback of incoming call melody. In addition, the system CPU 10 also issues a playback start instruction when the user operates a hold key of the portable telephone to start playback of hold sound.

To start playback of music, the sequencer 134 accesses the sequence data FIFO memory 132 to read sequence data consisting of duration data and note data. Then, the sequencer 134 extracts waveform numbers that are contained in the note data to designate waveform data, so that it writes them together with channel numbers designating tone-generation channels to the waveform number register within the first registers 131. Under the control of the system CPU 10, each waveform data designated by each waveform number is written to one of four waveform data FIFO memories 133*a*–133*d*, which is designated by the corresponding channel number. Next, a description will be given with respect to operations of the music playback section 15 shown in FIG. 4 that deals with sequence data shown in FIG. 6B. In FIG. 6B, note data 1 is allocated to channel 1 (Ch1) that is a tone-generation channel for generation of a musical note of note data 1. Hence, note data 1 is written to the waveform data FIFO memory 133*a* of channel 1, so that a playback start preparation is completed with respect to note data 1. Thus, the sequencer 134 waits for the start timing of note data 1 based on duration data 1, then, it controls the decoder 136 to start decoding on waveform data designated by note data 1. Therefore, the decoder 136 starts decoding on waveform data with respect to channel 1. Based on decoding results of waveform data, the digital-to-analog converter 137 outputs analog musical tone signals for channel 1. At the same time, the sequencer 134 reads the next pair of duration data 2 and note data 2 from the sequence data FIFO memory 132.

During decoding of waveform data designated by note data 1 in progress, when the amount of waveform data stored in the waveform data FIFO memory 133*a* of channel 1 decreases under the prescribed amount (e.g., 128 bytes), the waveform data FIFO memory 133*a* issues a waveform data IRQ flag (W-IRQ), which is set to the status register within the first registers 131. At the same time, the waveform data IRQ flag is also supplied to the IRQ control section 139 to notify the system CPU 10 of a shortage event in which the waveform data FIFO memory 133*a* runs short of waveform data. Thus, the system CPU 10 supplies the next portion of waveform data for channel 1 to the waveform data FIFO memory 133*a* by way of the waveform data register within the first registers 131. As a result, even though the waveform data FIFO memory 133*a* has a relatively small storage capacity, it is possible to reproduce numerous waveform data, which are necessary for high-quality reproduction, without interruption.

After reading duration data 2 and note data 2, the sequencer 134 writes a waveform number, which is contained in note data 2 to designate waveform data, to the waveform number register together with a channel number designating channel 2, which is a tone-generation channel for note data 2. Under the control of the system CPU 10, the designated waveform data is written to the waveform data FIFO memory 133*b* of channel 2. Thus, the sequencer 134 waits for the start timing of note data 2 based on duration data 2, then, it controls the decoder 136 to start decoding on waveform data designated by note data 2. The decoder 136 starts decoding on waveform data with respect to channel 2, so that the digital-to-analog converter 137 correspondingly outputs analog musical tone signals for channel 2. At the same time, the sequencer 134 reads the next pair of duration data 3 and note data 3 from the sequence data FIFO memory 132.

Since the decoder 136 operates in TDM, it performs decoding on waveform data of channel 1 and waveform data of channel 2 in TDM. Hence, the decoder 136 outputs PCM waveform data for two channels in TDM. The digital-to-analog converter 137 converts PCM waveform data of two channels to analog musical tone signals. Thus, the portable telephone produces polyphonic sounds based on the mixture of waveform data of channel 1 and channel 2.

After reading duration data 3 and note data 3, the sequencer 134 writes a waveform number, which is contained in note data 3 to designate waveform data, to the waveform number register together with a channel number designating channel 3, which is a tone-generation channel for note data 3. Under the control of the system CPU 10, the designated waveform data is written to the waveform data FIFO memory 133*c* of channel 3. The sequencer 134 waits for the start timing of note data 3 based on duration data 3. Before it comes to the start timing or note data 3, the end timing of note data 1 based on gate time 1 arrives on the sequencer 134. That is, the sequencer 134 stops the decoder 136 decoding waveform data of channel 1, so that the music playback section 15 stops producing sound of channel 1. At the same time, the sequencer 134 sets a gate time END flag (GEND) to the status register within the first registers 131, and it also clears duration data 1 and note data 1 in the sequence data FIFO memory 132.

Thereafter, when it comes to the start timing of note data 3 based on duration data 3, the sequencer 134 starts the decoder 136 to perform decoding on waveform data designated by note data 3. Thus, the decoder 136 starts decoding on waveform data for channel 3, so that the digital-to-analog converter 137 outputs analog musical tone signals for channel 3. At the same time, the sequencer 134 reads the next pair of duration data 4 and note data 4 (not shown) from the sequence data FIFO memory 132; and then it repeats the aforementioned operations.

As described above, each of note data, contained in pairs of duration data and note data of sequence data, is used to designate waveform data and a tone-generation channel. During decoding of waveform data designated by note data in progress, when the amount of waveform data stored in the waveform data FIFO memory of the designated tone-generation channel decreases under the prescribed amount (e.g., 128 bytes), the waveform data FIFO memory issues a waveform data IRQ flag (W-IRQ), which is set to the status register within the first registers 131. At the same time, the waveform data IRQ flag is also supplied to the IRQ control section 139 to notify the system CPU 10 of a shortage event in which the waveform data FIFO memory runs short of waveform data. Thus, the system CPU 10 writes the next portion of waveform data to the waveform data FIFO memory by way of the waveform data register with respect to the designated tone-generation channel. As a result, even though the waveform data FIFO memories 133*a*–133*d* each have a relatively small storage capacity, it is possible to reproduce numerous waveform data, which are necessary for high-quality reproduction, without interruption.

Due to progression of reproduction of waveform data based on sequence data, when the amount of sequence data stored in the sequence data FIFO memory 132 decreases under the prescribed amount (e.g., 8 bytes), the sequence data FIFO memory 132 issues a sequence data IRQ flag (S-IRQ), which is set to the status register within the first registers 131. At the same time, the sequence data IRQ flag is also supplied to the IRQ control section 139 to notify the system CPU 10 of a shortage event in which the sequence data FIFO memory 132 runs short of sequence data. Thus, the system CPU 10 writes the next portion of sequence data to the sequence data FIFO memory 132 by way of the sequence data register. As a result, even though the sequence data FIFO memory 132 has a relatively small storage capacity, it is possible to reproduce numerous sequence data, which are necessary for long-time reproduction, without interruption.

The aforementioned reproduction processes are repeatedly performed till an end of sequence data or until the user operates an end key of the portable telephone to stop playback. Until then, the portable telephone continuously reproduces sound of music based on sequence data.

When reproduced sound is used as music or incoming call sound (or incoming call melody), the speaker 23 produces reproduced sound. When reproduced sound is used as BGM or hold sound, it is mixed with received speech signals from the speech processor 14 by the mixer 138, so that the speaker 22 produces mixtures of reproduced sound and received speech. In the case of the hold sound, the mixer 138 mutes received speech signals, hence, the speaker 22 produces only the hold sound as the reproduced sound.

Figure 8:
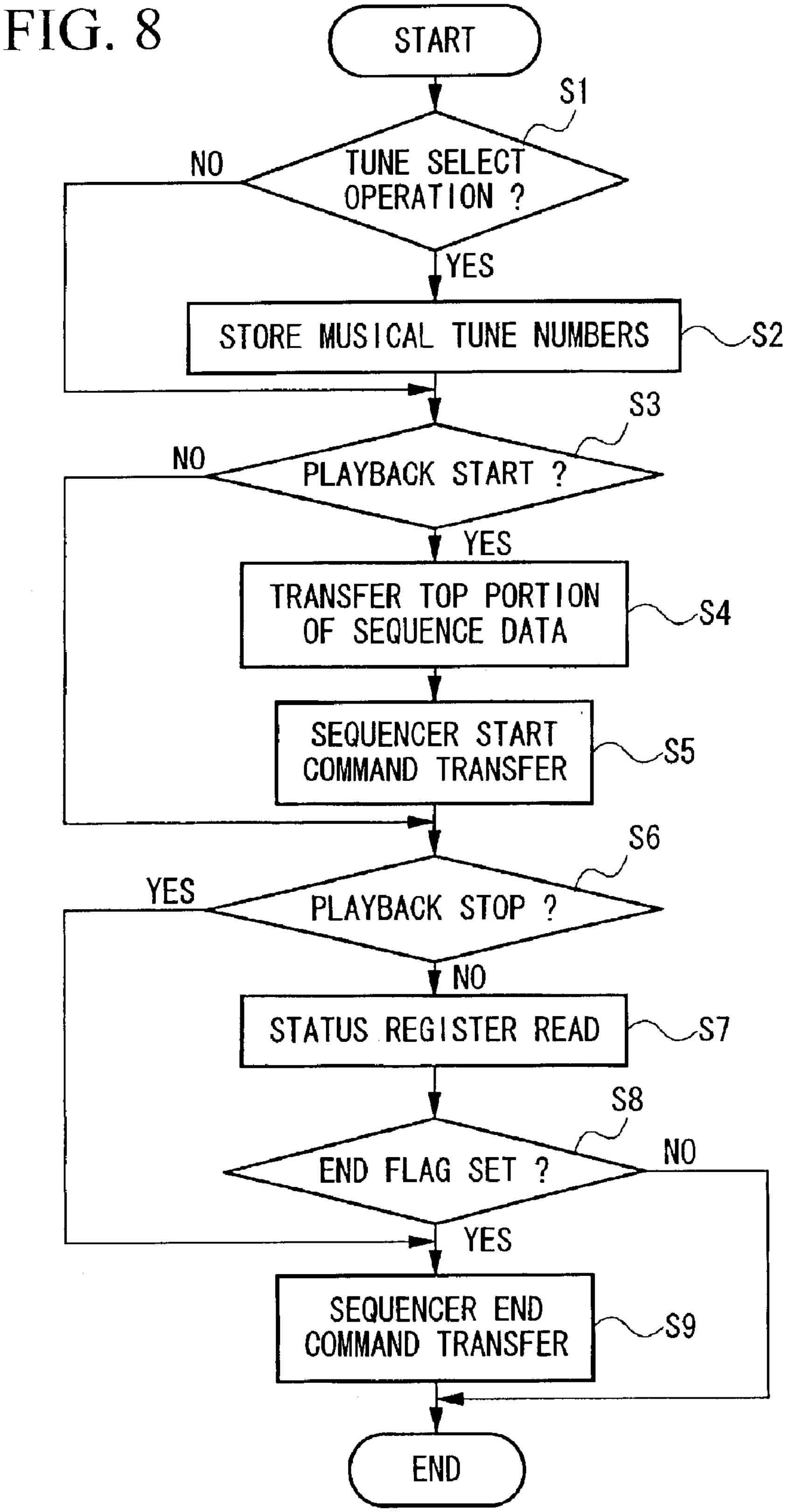
FIG. 8 is a flowchart showing a main process for assisting music playback processes of the music playback section.

Next, descriptions will be given with respect to processes that are executed by the system CPU 10 to assist music playback processes of the music playback section 15. FIG. 8 shows a main process for assisting the music playback processes. First, the system CPU 10 proceeds to tune select operations that allow the user to select a musical tune (or musical tunes) on the screen of the display 18 of the portable telephone 1. There are provided four types of tune select operations for use in different purposes, namely a first tune select operation allows the user to select a musical tune for use in incoming call notification for producing incoming call melody, a second tune select operation allows the user to select a musical tune for use in hold sound generation designated by the hold key, a third tune select operation allows the user to select a musical tune for use in BGM playback for generating BGM mixed with received speech signals, and a fourth tune select operation allows the user to select a musical tune for use in music playback. In step S1, a decision is made as to whether or not the user performs any one of the aforementioned tune select operations. Therefore, the user is able to select musical tune numbers designating musical tunes for use in different purposes respectively. When the system CPU 10 detects in step S1 that the user performs the tune select operation, the flow proceeds to step S2 in which the musical tune number selected for each of four uses (namely, incoming call notification, hold sound generation, BGM playback, and music playback) is stored in the system RAM 11. Then, the flow proceeds to step S3. When the system CPU 10 does not detect that the user performs the tune select operation, the flow proceeds directly to step S3 by skipping step S2. In step S3, a decision is made as to whether or not playback is started. The start of playback is detected when the user operates the playback key of the portable telephone to start playback of BGM or music. In the case of the incoming call notification, the start of playback is detected when the portable telephone receives incoming call signals. In the case of the hold sound generation, the start of playback is detected when the user operates the hold key of the portable telephone.

When the start of playback is detected in step S3, the flow proceeds to step S4 in which the system CPU 10 transfers a head portion of sequence data to the music playback section 15. That is, the system CPU 10 proceeds to transfer of sequence data in connection with a musical tune number that is selected by the user to cope with a specific use, namely incoming call notification, hold sound generation, BGM playback or music playback. Firstly, the system CPU 10 transfers only several bytes of the head portion of sequence data to the sequence data FIFO memory of the music playback section 15. In step S5, the system CPU 10 performs a sequencer start command transfer process to write sequencer start command data to the sequencer control register of the music playback section 15. By writing the sequencer start command data, the system CPU 10 starts playback of a musical tune for use in a specific use, which is detected in the foregoing step S3. If the system CPU 10 fails to detect the start of playback with respect to any one of four uses in step S3, the flow skips steps S4 and S5.

In step S6, a decision is made as to whether or not playback is stopped. The stop of playback is detected when the user operates an end key of the portable telephone to stop playback of BGM or music. In the case of the incoming call notification, the stop of playback is detected when the user operates a conversation key of the portable telephone. In the case of the hold sound generation, the stop of playback is detected when the user operates a hold release key of the portable telephone. If the system CPU 10 fails to detect the stop of playback with respect to any one of four uses in step S6, the flow proceeds to step S7 in which the system CPU 10 performs a status register read process to read the data of the status register of the music playback section 15 therein. In step S8, a decision is made as to whether or not playback is completed on sequence data with reference to an END flag that is set to the status register and is read into the system CPU 10.

When the system CPU 10 detects that playback is completed on sequence data because an END flag is set to the status register of the music playback section 15, the flow proceeds to step S9 in which the system CPU 10 performs a sequencer stop command transfer process to write sequencer stop command data to the sequencer control register of the music playback section 15. By writing the sequencer stop command data, the system CPU 10 stops operations of internal circuits of the music playback section 15. Therefore, the system CPU 10 clears various kinds of flags and data stored in the sequence data FIFO memory and waveform data FIFO memory. If the system CPU 10 fails to detect that playback is completed on sequence data in step S8, it ends the main process.

If the stop of playback is detected in step S6, the flow proceeds directly to step S9 in which the system CPU 10 performs a sequencer stop command transfer process to write sequencer stop command data to the sequencer control register of the music playback section 15. Thus, the system CPU 10 stops playback processes of the music playback section 15 to end the main process.

Figure 9:
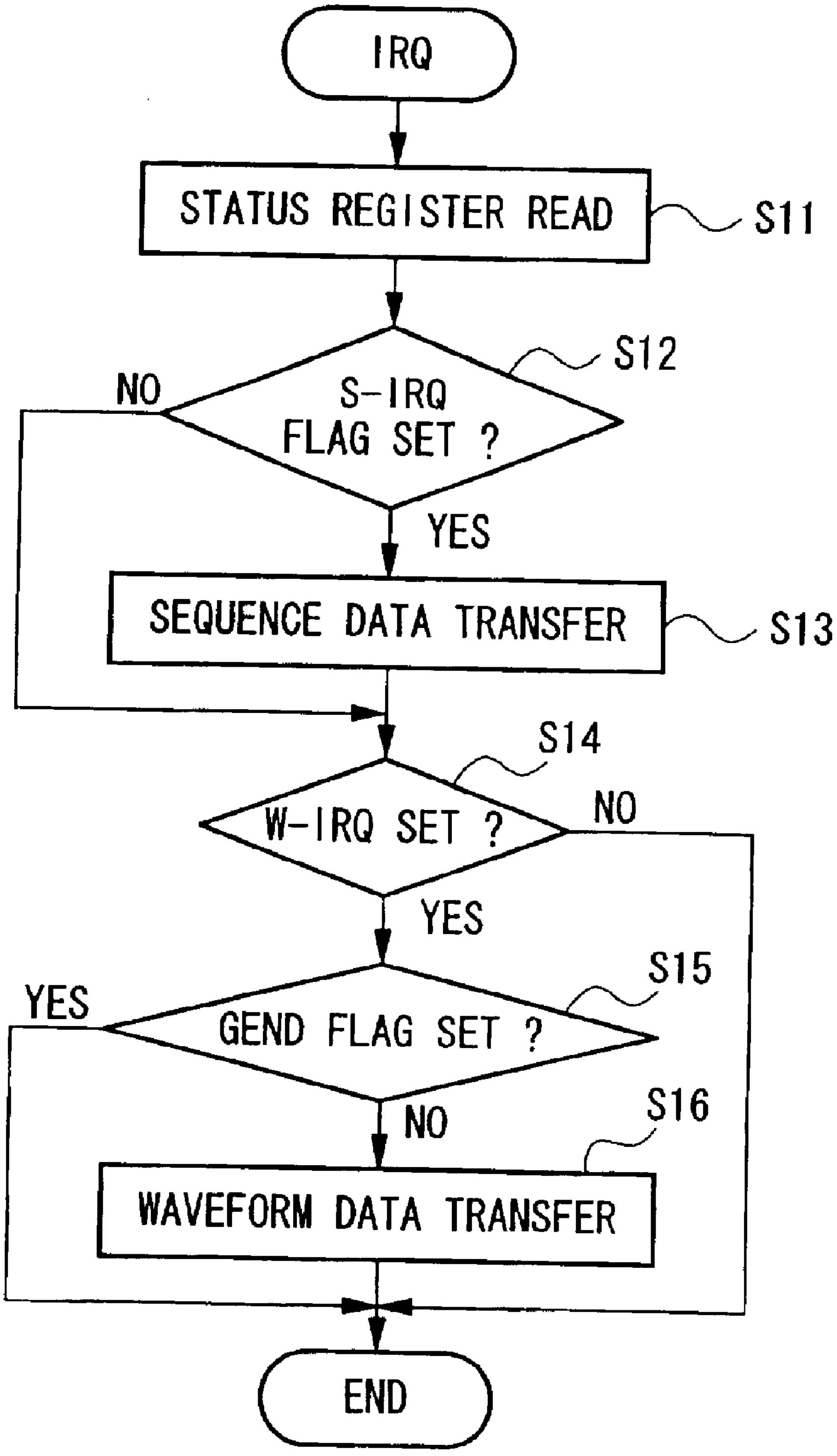
FIG. 9 is a flowchart showing an IRQ process for assisting music playback processes of the music playback section.

FIG. 9 shows an IRQ process that is executed by the system CPU 10 to assist music playback processes of the music playback section. That is, the system CPU 10 starts the IRQ process upon receipt of an IRQ signal (or IRQ flag).

Upon receipt of the IRQ signal, the flow proceeds to step S11 in which the system CPU 10 performs a status register read process to read the data of the status register of the music playback section 15 therein. In step S12, a decision is made as to whether or not a sequence data IRQ flag is set to the status register. When the sequence data IRQ flag is set to the status register, it is possible to specify the cause of an IRQ as the shortage of sequence data in the sequence data FIFO memory. In step S13, the system CPU 10 performs a sequence data transfer process to transfer the prescribed amount of sequence data (e.g., 24 bytes) to the sequence data FIFO memory of the music playback section 15. Then, the flow proceeds to step S14. When the system CPU 10 detects in step S12 that the sequence data IRQ flag is not set to the status register, the flow directly proceeds to step S14 by skipping step S13.

In step S14, a decision is made as to whether or not a waveform data IRQ flag is set to the status register. When the waveform data IRQ flag is set to the status register, it is possible to specify the cause of an IRQ as the shortage of waveform data in the waveform data FIFO memory. In step S15, a decision is made as to whether or not a gate time END flag GEND is set to the status register. When the system CPU 10 detects in step S15 that the gate time END flag GEND is not set to the status register, the flow proceeds to step S16 in which a waveform data transfer process is performed to transfer the prescribed amount of waveform data (e.g., 256 bytes) to the waveform data FIFO memory of the music playback section 15 because the waveform data IRQ flag is set to the status register and is detected in step S14. In order to specify the 'transferring' waveform data, the system CPU 10 performs the waveform data transfer process with reference to the content of the waveform number register of the music playback section 15.

When the system CPU 10 detects in step S15 that the gate time END flag is set to the status register, it immediately ends the IRQ process by skipping the waveform data transfer process of step S16 even though the waveform data IRQ flag is set to the status register to indicate the shortage of waveform data in the waveform data FIFO memory. Because, when the gate time END flag is set to the status register by the end of the gate time (i.e., tone-generation period or note length), it is unnecessary to further reproduce waveform data, in other words, it is unnecessary to further transfer waveform data to the waveform data FIFO memory. In addition, when the system CPU 10 detects in step S14 that the waveform data IRQ flag is not set to the status register, it is unnecessary to perform the waveform data transfer process, so that the system CPU 10 immediately ends the IRQ process.

As described above, the music playback device of the present invention executes music playback processes to play back selected musical tunes in connection with four uses. That is, the music playback device plays back a musical tune as incoming call sound (or incoming call melody) when the portable telephone receives incoming call signals. The music playback device plays back a musical tune as hold sound when the user operates the hold key of the portable telephone. The music playback device plays back a musical tune as BGM or music when the user operates the playback key of the portable telephone. In the aforementioned cases, the music playback device plays back musical tunes that are selected by the user to cope with four uses respectively. Herein, it is possible to select different musical tunes independently for four uses, namely incoming call notification, hold sound generation, BGM playback, and music playback. Incidentally, the portable telephone allows the user to perform tune select operations at all times. Hence, the user is able to arbitrarily select musical tunes to be played back for four uses respectively at any time.

Basically, processing of the system CPU 10 is mainly occupied by the telephone function processes (which are not explained in conjunction with the drawings), while the aforementioned processes of FIGS. 8 and 9 for assisting music playback processes require only a small load of processing. Hence, even though music playback assisting processes are executed together with telephone function processes, it is unnecessary to install a high-speed CPU in a portable telephone as the system CPU 10.

The sequence data FIFO memory has a limited storage capacity for storing thirty-two byes of sequence data, which is merely an example and is not necessarily a restrictive matter. That is, the portable telephone requires the sequence data FIFO memory having a very small storage capacity compared with the system RAM 11. In addition, the waveform data FIFO memory has a limited storage capacity for storing 384 bytes of waveform data, which is merely an example and is not necessarily a restrictive matter. That is, the portable telephone requires the waveform data FIFO memory having a very small storage capacity compared with the system RAM 11.

As described heretofore, this invention is not limited to the aforementioned embodiments, hence, it is possible to provide a variety of modifications within the scope of the invention and without departing from the essential subject matter of the invention.

What is claimed is:

1. A musical tune playback device that performs musical tune playback in a portable telephone device incorporating a system control means, which does not have musical tune playback functions but provides telephone function processing as a main process, comprising:

an interface means;

a read/write-enable musical tune data storage means for storing musical tune data containing tone-generation data and tone-generation interval data, which are input thereto via the interface means, wherein the amount of musical tune data to be stored is limited;

a read/write-enable waveform data storage means for storing waveform data input thereto via the interface means, wherein the amount of waveform data to be stored is limited;

a monitor means for monitoring a vacant capacity of the musical tune data storage means and a vacant capacity of the waveform data storage means;

a waveform reproduction means for reproducing and outputting musical tone signals based on the waveform data, which are read from the waveform data storage means; and a performance control means for reading the musical tune data stored in the musical tune data storage means and for controlling the waveform reproduction means to reproduce the musical tone signals based on the read musical tune data, wherein when a prescribed size of a vacant area emerges in the musical tune data storage means, the monitor means communicates a data transfer request to the system control means, which in turn reads from a system storage means the following musical tune data, which are input via the interface means and are stored in the vacant area of the musical tune data storage means, and wherein when a prescribed size of a vacant area emerges in the waveform data storage means, the monitor means communicates a data transfer request to the system control means, which in turn reads from the system storage means the following waveform data, which are input via the interface means and are stored in the vacant area of the waveform data storage means.

2. A musical tune playback device according to claim 1, wherein when waveform data designated by waveform designation data contained in the tone-generation data of the musical tune data, which are read from the musical tune data storage means, are not written into the waveform data storage means, the monitor means communicates a data transfer request to the system control means, which in turn inputs via the interface means the waveform data, which are read from the system storage means and are then written into the waveform data storage means.

3. A musical tune playback device according to claim 1, wherein upon reception of the data transfer request, the system control means refers to a flag status in the performance control means to read the following musical tune data or the following waveform data from the system storage means.

4. A musical tune playback device according to claim 1, wherein the waveform data are compressed in advance so that the waveform data read from the waveform data storage means are decoded in the waveform reproduction means to be expanded.

5. A portable telephone device having musical tune playback functions, which provides a system control means whose main process corresponds to telephone function processing, and a musical tune playback means for reproducing musical tone signals in cooperation with the system control means, and which also provides a system storage means that is managed by the system control means to store at least musical tune data and waveform data, wherein said musical tune playback means comprises an interface means, a read/write-enable musical tune data storage means for storing musical tune data containing tone-generation data and tone-generation interval data, which are input thereto via the interface means, wherein the amount of musical tune data to be stored is limited, a read/write-enable waveform data storage means for storing waveform data input thereto via the interface means, wherein the amount of waveform data to be stored is limited, a monitor means for monitoring a vacant capacity of the musical tune data storage means and a vacant capacity of the waveform data storage means, a waveform reproduction means for reproducing and outputting musical tone signals based on the waveform data, which are read from the waveform data storage means, and a performance control means for reading the musical tune data stored in the musical tune data storage means and for controlling the waveform reproduction means to reproduce the musical tone signals based on the read musical tune data, wherein when a prescribed size of a vacant area emerges in the musical tune data storage means, the monitor means communicates a data transfer request to the system control means, which in turn reads from the system storage means the following musical tune data, which are input via the interface means and are stored in the vacant area of the musical tune data storage means, and wherein when a prescribed size of a vacant area emerges in the waveform data storage means, the monitor means communicates a data transfer request to the system control means, which in turn reads from the system storage means the following waveform data, which are input via the interface means and are stored in the vacant area of the waveform data storage means.

6. A portable telephone device having musical tune playback functions according to claim 5, wherein with reference to waveform designation data contained in the tone-generation data of the musical tune data storage means, the system control means transfers to the musical tune playback means the designated waveform data, which are input via the interface means and are written into the waveform data storage means.

7. A portable telephone device having musical tune playback functions according to claim 5, wherein upon reception of the data transfer request and with reference to a flag status in the performance control means, the system control means makes a decision whether to read the following musical tune data or the following waveform data from the system storage means.

8. A portable telephone device having musical tune playback functions according to claim 5, wherein the waveform data are compressed in advance so that the waveform data read from the waveform data storage means are decoded in the waveform reproduction means to be expanded.

9. A portable telephone device having musical tune playback functions according to claim 5, wherein the musical tune data and the waveform data are respectively downloaded via communications and are stored in the system storage means.

10. A portable telephone device having musical tune playback functions according to claim 5, wherein the waveform reproduction means is subjected to direct controls without intervention of the musical tune data storage means and the performance control means, so that the waveform reproduction means reproduces musical tone signals based on waveform reproduction parameters supplied from the system control means.

11. A portable telephone device having musical tune playback functions according to claim 5, wherein at an end of a gate time designated by the musical tune data, the system control means makes preparation for reading the following waveform data from the system storage means.

* * * * *